United States Patent
Sim et al.

(10) Patent No.: US 9,083,787 B2
(45) Date of Patent: Jul. 14, 2015

(54) APPARATUS AND METHOD FOR DRIVING COMMUNICATION TERMINAL USING PROXIMITY SENSOR FOR DIALING

(75) Inventors: Jae Kwang Sim, Gumi-si (KR); Hark Sang Kim, Seoul (KR); Sang Ryul Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 13/033,043

(22) Filed: Feb. 23, 2011

(65) Prior Publication Data

US 2011/0300881 A1    Dec. 8, 2011

(30) Foreign Application Priority Data

Jun. 4, 2010  (KR) ................ 10-2010-0052707

(51) Int. Cl.
  *H04W 24/00*    (2009.01)
  *H04M 1/26*     (2006.01)
  *H04M 1/725*    (2006.01)
  *H04W 76/02*    (2009.01)
  *H04W 88/02*    (2009.01)

(52) U.S. Cl.
  CPC ............ *H04M 1/26* (2013.01); *H04M 1/72594* (2013.01); *H04M 2250/12* (2013.01); *H04M 2250/22* (2013.01); *H04W 76/02* (2013.01); *H04W 88/02* (2013.01)

(58) Field of Classification Search
  CPC .............. H04M 1/26; H04M 1/72594; H04M 2250/12; H04M 2250/22; H04W 76/02; H04W 88/02

USPC ........... 455/564, 563, 193, 417, 456.3, 556.1; 379/211.02, 202.01; 348/14.02; 714/807; 345/174

See application file for complete search history.

(56) References Cited

U.S. PATENT DOCUMENTS

| | | | |
|---|---|---|---|
| 5,454,029 A * | 9/1995 | Noda | 379/88.16 |
| 6,198,947 B1 * | 3/2001 | Barber | 455/563 |
| 7,225,409 B1 * | 5/2007 | Schnarel et al. | 715/747 |
| 7,680,513 B2 * | 3/2010 | Haitani et al. | 455/556.2 |
| 2003/0210203 A1 * | 11/2003 | Phillips et al. | 343/850 |
| 2006/0161871 A1 * | 7/2006 | Hotelling et al. | 715/863 |
| 2009/0215494 A1 * | 8/2009 | Causey et al. | 455/564 |
| 2009/0286479 A1 * | 11/2009 | Thoresson et al. | 455/41.3 |
| 2009/0305742 A1 * | 12/2009 | Caballero et al. | 455/566 |
| 2010/0167783 A1 * | 7/2010 | Alameh et al. | 455/556.1 |
| 2010/0283756 A1 * | 11/2010 | Ku et al. | 345/174 |
| 2010/0297946 A1 * | 11/2010 | Alameh et al. | 455/41.3 |

FOREIGN PATENT DOCUMENTS

| | | |
|---|---|---|
| KR | 10-0790060 B1 | 12/2007 |
| KR | 10-2010-0028989 A | 3/2010 |

* cited by examiner

*Primary Examiner* — Mahendra Patel
(74) *Attorney, Agent, or Firm* — Jefferson IP Law, LLP (57) ABSTRACT

An apparatus and a method for driving a communication terminal are provided. A method for driving a communication terminal according to the present invention includes determining, when a proximity of an object is detected, data based on a proximity duration for which the proximity is maintained, and executing, when an execution request is detected, a function corresponding to the data. Since a specific function is executed in response to the information on the proximity of an object to the communication terminal, there is no need to display touch keys on the screen, resulting in improvement of user's convenience.

14 Claims, 6 Drawing Sheets

APPARATUS AND METHOD FOR DRIVING COMMUNICATION TERMINAL USING PROXIMITY SENSOR FOR DIALING

PRIORITY

This application claims the benefit under 35 U.S.C. §119(a) of a Korean patent application filed on Jun. 4, 2010 in the Korean Intellectual Property Office and assigned Serial No. 10-2010-0052707, the entire disclosure of which is hereby incorporated by reference.

BACKGROUND OF THE INVENTION

1. Field of the Invention

The present invention relates to a communication terminal. More particularly, the present invention relates to an apparatus and method for driving a communication terminal.

2. Description of the Related Art

Communication terminals are currently equipped with supplementary functions for providing converged services. Although the communication terminals may be provided with an input device such as a keyboard and a mouse, there is a limit to the available designs for the input interface that do not compromise the portability of the communication terminals. In order to provide an efficient input interface, the recent communication terminal is equipped with a touchscreen instead of the keyboard and/or mouse. In this case, the keys are displayed on the touchscreen such that a user may input an execution command by touching one of the keys on the touchscreen.

In such a touchscreen-enabled communication terminal, the keys are presented on the touchscreen so as to be easily recognized by the user. This is because the keys displayed on the touchscreen do not give distinguishable tactile feedback, resulting in degradation of the user's convenience. In the case of a visually impaired person, the problem becomes worse.

There is therefore a need of a method for facilitating interactive feedback of the touchscreen-enabled communication terminal in response to the user input.

SUMMARY OF THE INVENTION

An aspect of the present invention is to address at least the above-mentioned problems and/or disadvantages and to provide at least the advantages described below. Accordingly, an aspect of the present invention is to provide a method and apparatus for driving a communication terminal with a touchscreen.

In accordance with an aspect of the present invention, a method for driving a communication terminal is provided. The method includes determining, when a proximity of an object is detected, data based on a proximity duration for which the proximity is maintained, and executing, when an execution request is detected, a function corresponding to the data. In an exemplary implementation, the determining of the data is repeated before the execution request is detected. In an exemplary implementation, the data is a part of a phone number and the executing of the function comprises making a call to the phone number.

In an exemplary implementation, the determining of the data includes measuring the proximity duration between the time when the proximity of the object is detected and a current time, retrieving, when the proximity of the object is released, an indication number corresponding to the proximity duration, and determining the indication number as one of digits of the phone number. In an exemplary implementation, a notification is made of the indication number corresponding to the proximity duration when the indication number is retrieved. In an exemplary implementation, the notification includes outputting the indication number as voice sound. In an exemplary implementation, the retrieving of the indication number includes confirming the indication number as a digit of the phone number.

In accordance with another aspect of the present invention, an apparatus for driving a communication terminal is provided. The apparatus includes a sensor for sensing proximity of an object within a range of a threshold distance, and a control unit for determining, when the proximity of the object is detected, data based on a proximity duration for which the proximity is maintained and for executing, when an execution request is detected, a function corresponding to the data. In an exemplary implementation, the control unit repeats the determining of the data input. In an exemplary implementation, the apparatus further includes a radio frequency unit for transmitting a call to a phone number under the control of the control unit, wherein the data is a part of the phone number.

In an exemplary implementation, the control unit measures the proximity duration between the time where the proximity of the object is detected and a current time, retrieves, when the proximity of the object is released, an indication number corresponding to the proximity duration, and determines the indication number as one of digits of the phone number. In an exemplary implementation, the control unit notifies of the indication number corresponding to the proximity duration when the indication number is retrieved. In an exemplary implementation, the apparatus further includes an audio processing unit which outputs, when the indication number is retrieved, the indication number as voice sound under the control of the control unit. In an exemplary implementation, the control unit confirms the indication number as a digit of the phone number.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
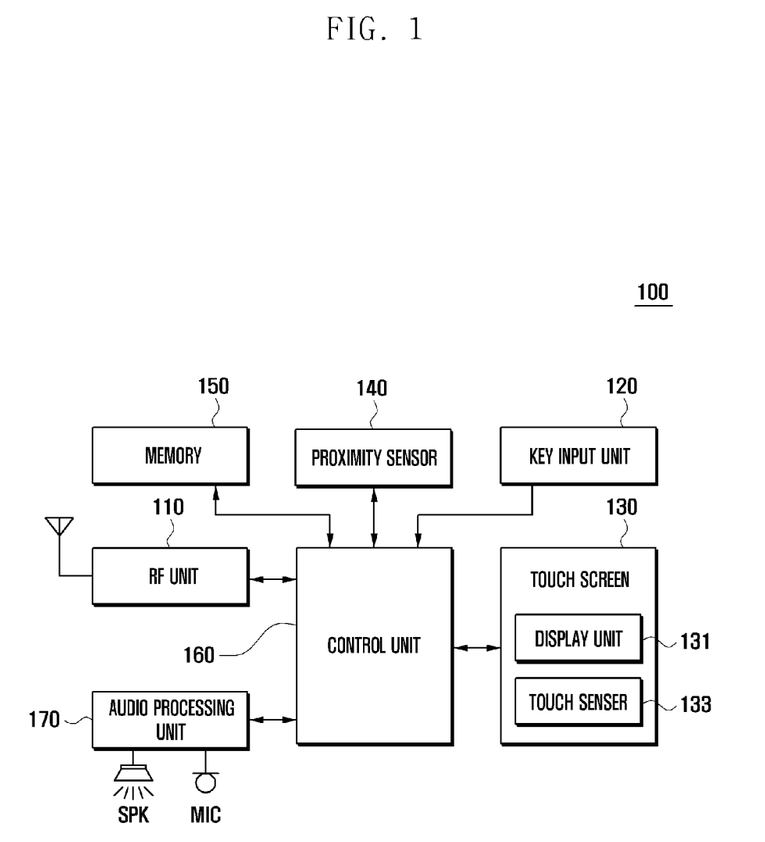
FIG. 1 is a block diagram illustrating a configuration of a communication terminal according to an exemplary embodiment of the present invention.

FIG. 1 is a block diagram illustrating a configuration of a communication terminal according to an exemplary embodiment of the present invention.

Referring to FIG. 1, a driving apparatus of the communication terminal 100 includes a Radio Frequency (RF) unit 110, a key input unit 120, a touchscreen 130, a proximity sensor 140, a memory 150, a control unit 160, and an audio processing unit 170. In this exemplary embodiment, the description is directed to a mobile terminal as the communication terminal. However, it is to be understood that the inventive concept is applicable to any communication device.

The RF unit 110 is responsible for radio communication of the communication terminal 100. The RF unit 110 includes an RF transmitter for up-converting and amplifying a transmit signal and an RF receiver for low noise amplifying and down-converting a receive signal.

The key input unit 120 is provided with a plurality of function keys for setting and executing various functions. For example, the key input unit 120 can include a call key for making an outgoing call.

The touchscreen 130 includes a display unit 131 and a touch sensor 133. The display unit 131 displays the operation status of the communication terminal 100. The display unit 131 is implemented with a Liquid Crystal Display (LCD) and includes an LCD controller, a video memory for storing the video data, and LCD devices. The touch sensor 133 detects a touch made on the display unit 131. The touch sensor 133 is mounted on the display unit 131 and can include a touch detector (not shown) and a signal converter (not shown). The touch detector determines a touch by detecting variations of a physical parameter such as resistance or capacitance. The signal converter converts the variation of the physical parameter to a touch signal.

The proximity sensor 140 senses the presence of an object near the communication terminal. That is, the proximity sensor 140 detects the approach of an object within a predetermined range. In an exemplary implementation, the proximity detection can be performed by analyzing variations of a luminous intensity around the communication terminal, by analyzing variations of a physical parameter such as capacitance, and the like. For example, the proximity sensor 140 may be implemented with a photodiode and may detect the approach of an object by emitting light and collecting and analyzing reflected light.

The memory 150 may include program and data memories. The program memory stores application programs associated with supplementary functions of the communication terminal 100. For example, the program memory can store an application program for determining a number for placing a call based on proximity of an object. The data memory stores data generated while application programs are running. The memory 150 also stores mappings between reference durations and numbers.

The control unit 160 controls operations of the communication terminal. The control unit 160 includes a data processing unit having a transmitter for encoding and modulating the transmit signal and a receiver for demodulating and decoding the receive signal. In this case, the data processing unit can include a modem and a codec. The codec includes a data codec for processing packet data and an audio codec for processing an audio signal such as a voice. According to an exemplary embodiment of the present invention, the control unit 160 detects the proximity of an object and determines a corresponding number for placing a call. For this purpose, the control unit 160 can determine the time during which the proximity is maintained, i.e. the proximity duration. The control unit 160 also can compare the proximity duration with the reference durations stored in the memory 150 to retrieve at least one digit of the call number with which to make a call based on the comparison result. According to an exemplary embodiment of the present invention, the control unit 160 controls to make a call to the determined call number in response to the user's request.

The audio processing unit 170 is responsible for outputting the audio signal output by the audio codec of the data processing unit through a speaker (SPK) and transferring an audio signal input through a microphone (MIC) to the audio codec of the data processing unit.

Figure 2:
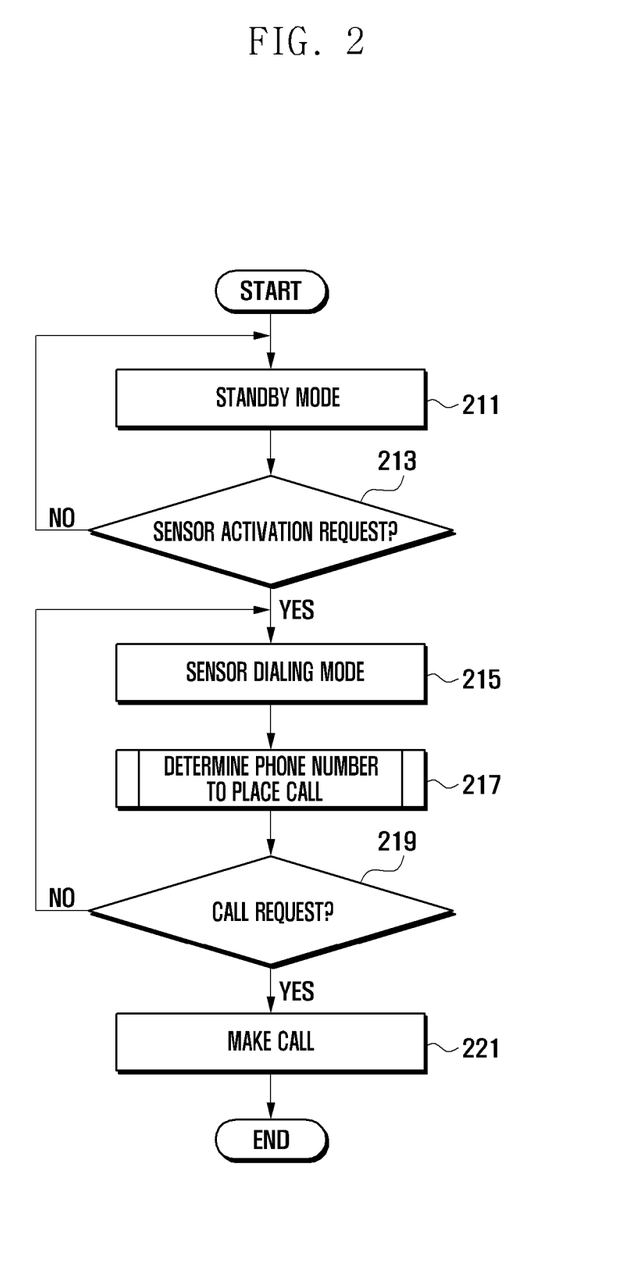
FIG. 2 is a flowchart illustrating a method for driving a communication terminal according to an exemplary embodiment of the present invention.

FIG. 2 is a flowchart illustrating a method for driving a communication terminal according to an exemplary embodiment of the present invention.

Referring to FIG. 2, the communication terminal is in a standby mode in step 211. In the standby mode, the control unit 160 monitors to detect a signal. When a signal is detected, the control unit 160 determines whether the signal is a sensor driving request in step 213. If it is determined in step 213 that the sensor driving request is detected, the control unit 160 activates the proximity sensor 140 to enter a sensor dialing mode in step 215. In order to activate the sensor dialing mode, the key input unit 120 may include a sensor dialing mode activation key. Alternatively, the sensor dialing mode activation can be performed with a combination of other keys. Once the sensor dialing mode is activated, the control unit 160 determines the call number to which a call will be made in step 217. The call number determination process will be described in more detail below.

Figure 3:
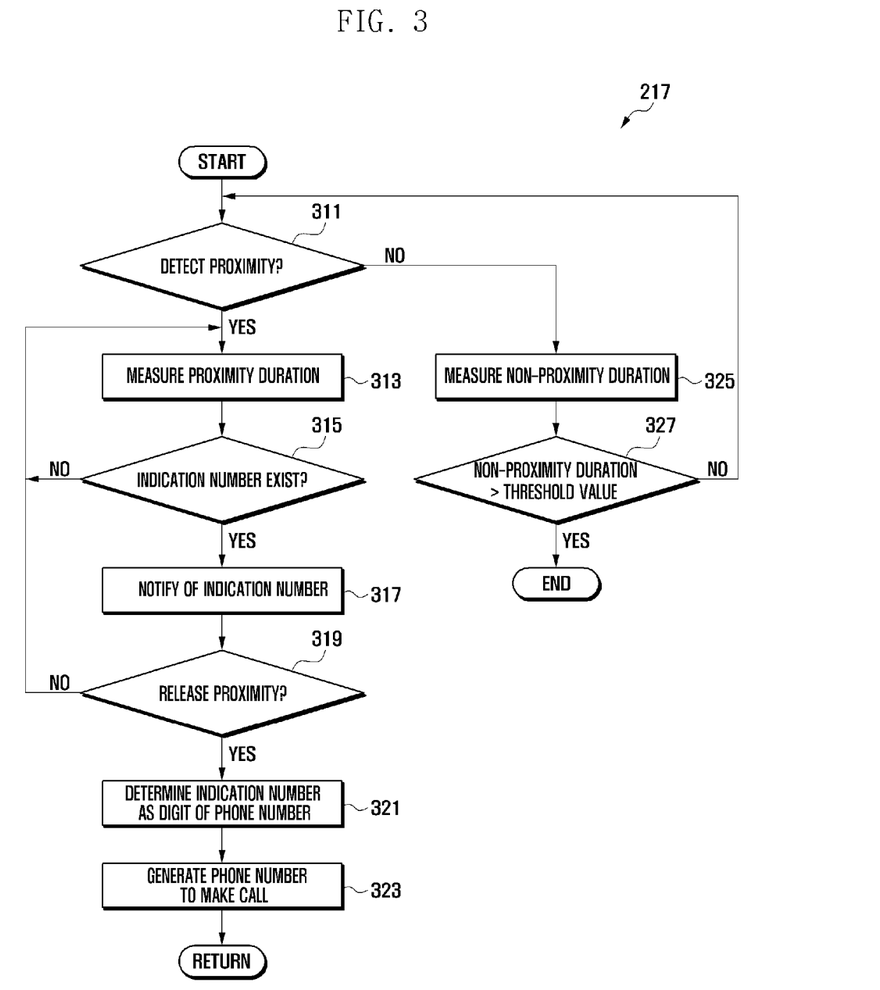
FIG. 3 is a flowchart illustrating a call number determination process according to an exemplary embodiment of the present invention.
Figure 4:
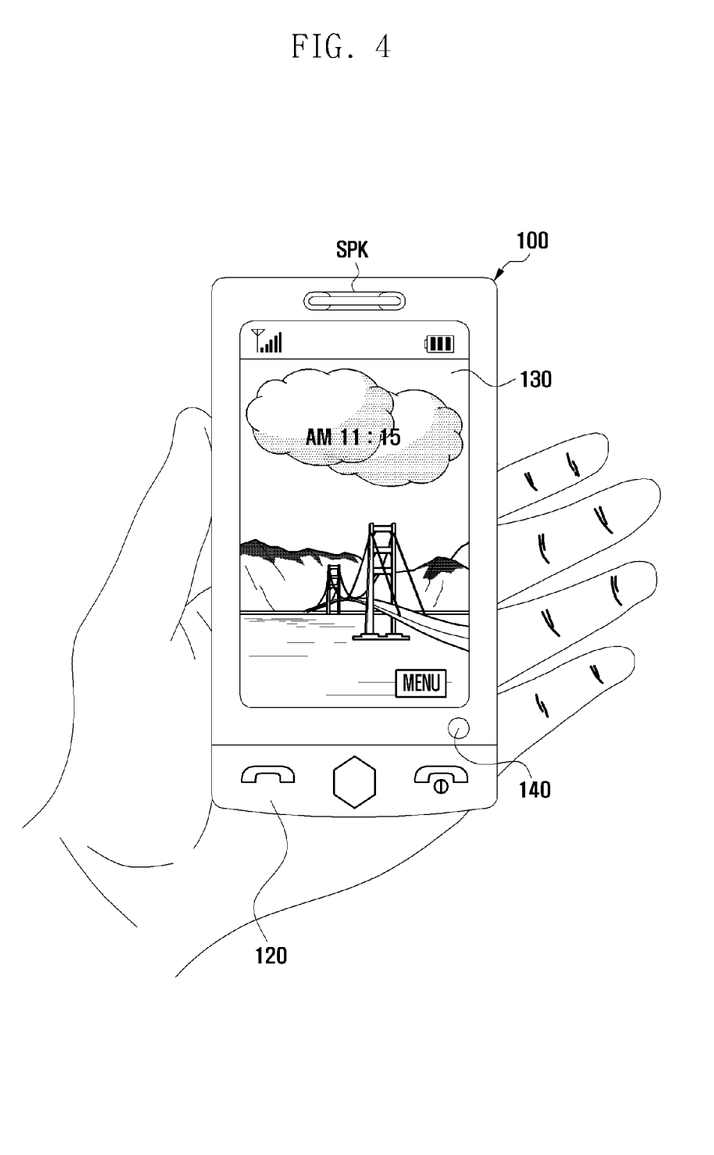
FIG. 4 is a diagram illustrating the status of a terminal operating in a standby mode according to an exemplary embodiment of the present invention.
Figure 5:
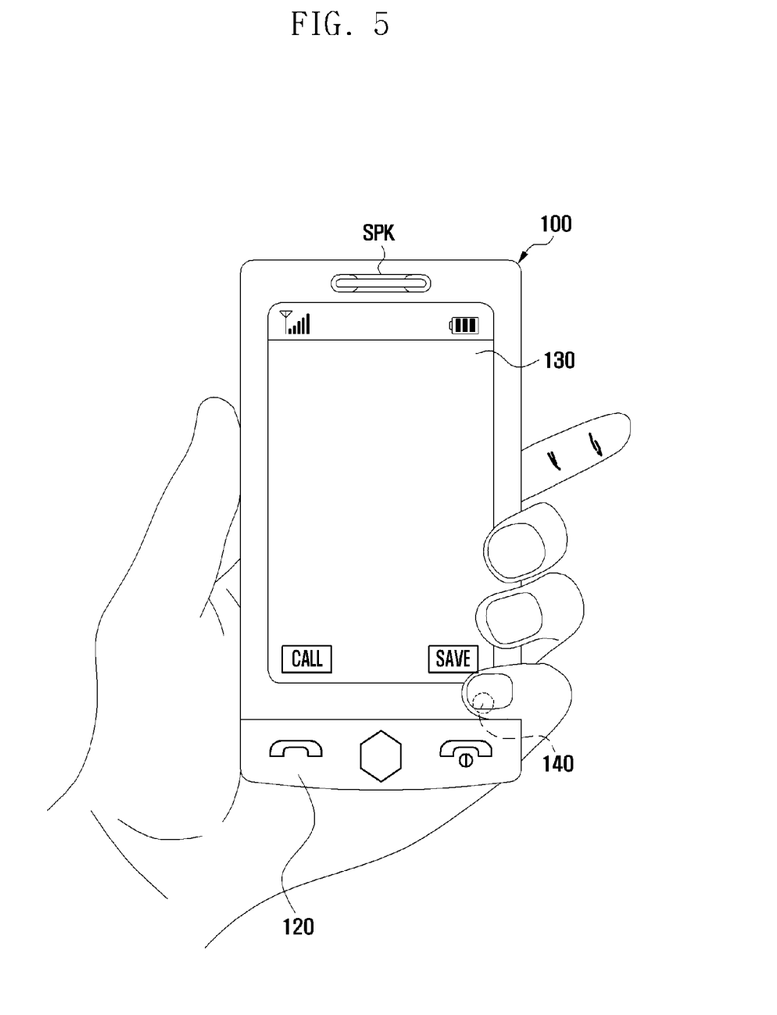
FIG. 5 is a diagram illustrating a method of detecting proximity by a mobile terminal according to an exemplary embodiment of the present invention.
Figure 6:
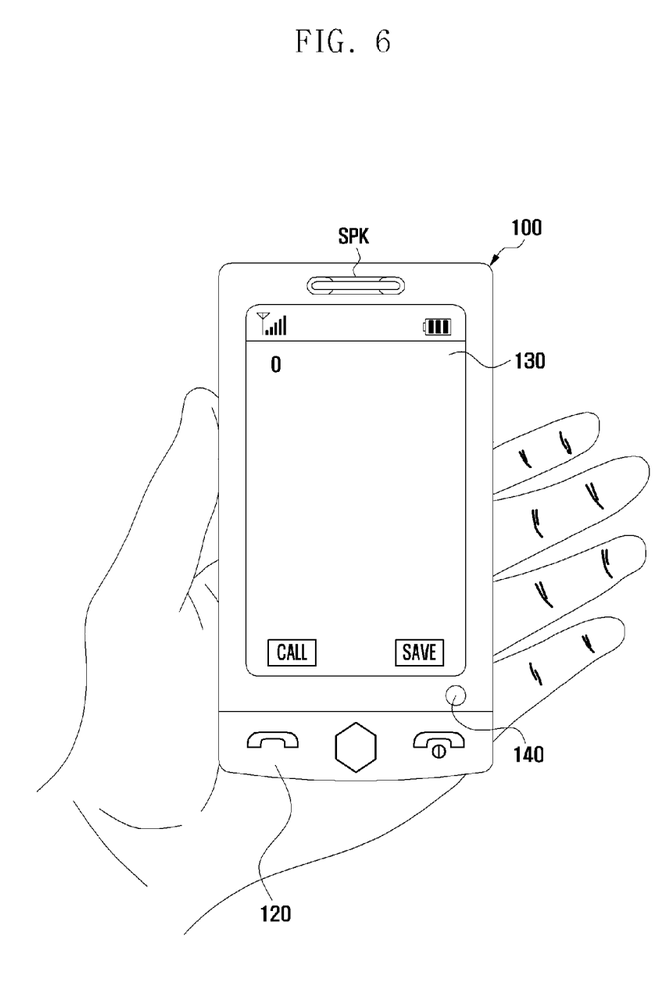
FIG. 6 is a diagram illustrating a method of detecting release of proximity by a mobile terminal according to an exemplary embodiment of the present invention.

FIGS. 3 to 6 are drawings illustrating operations of a communication terminal in association with a communication terminal-driving method according to an exemplary embodiment of the present invention. More specifically, FIG. 3 is a flowchart illustrating a call number determination process according to an exemplary embodiment of the present invention, FIG. 4 is a diagram illustrating the status of a terminal operating in a standby mode according to an exemplary embodiment of the present invention, FIG. 5 is a diagram illustrating a method of detecting proximity by a mobile terminal according to an exemplary embodiment of the present invention, and FIG. 6 is a diagram illustrating a method of detecting release of proximity by a mobile terminal according to an exemplary embodiment of the present invention.

Referring to FIG. 3, in the call number determination process of the communication terminal 100, the control unit 160 monitors to detect proximity of an object, i.e. finger in step 311. For example, when the communication terminal 100 is in the sensor dialing mode, as shown in FIG. 4, the control unit 160 determines whether an object approaches the proximity sensor 140. If it is determined in step 311 that the proximity of an object is detected, as shown in FIG. 5, the control unit 160 measures the proximity duration in step 313. At this time, the control unit 160 can determine the duration of the proximity relative to the current time. If the proximity is maintained continuously, the control unit 160 can measure the duration between the start point of the proximity and the current time repeatedly.

In step 315, the control unit 160 determines whether there is an indication number corresponding to the measured proximity duration in the memory. At this time, the existence of an indication number is determined by retrieving a reference duration that is substantially identical with the measured proximity duration from the memory 150. For example, if the proximity is maintained for 1 second, the control unit 160 searches the memory 150 for the reference duration of 1 second. The memory 150 can store the mappings between the reference durations and the corresponding indication numbers in the form of a table as shown in Table 1.

TABLE 1

| Reference time | Indication number |
| --- | --- |
| 1 second | 0 |
| 2 seconds | 1 |
| 3 seconds | 2 |
| 4 seconds | 3 |
| 5 seconds | 4 |
| 6 seconds | 5 |
| 7 seconds | 6 |
| 8 seconds | 7 |
| 9 seconds | 8 |
| 10 seconds | 9 |

If it is determined in step 315 that there is no indication number corresponding to the proximity duration, the control unit 160 repeats steps 313 and 315. Otherwise, if it is determined in step 315 that there is an indication number corresponding to the proximity duration, the control unit 160 notifies of the indication number in step 317. When the measured proximity duration is equal to one of the reference durations, the control unit 160 retrieves the indication number mapped to the corresponding reference duration. In an exemplary implementation, the control unit 160 can control the audio processing unit 170 to output the indication number as a sound. For example, the control unit 160 can retrieve the indication number of 0 mapped to the reference duration of 1 second. The control unit 160 also can control the audio processing unit 170 to output the sound 'zero' corresponding to the indication number '0' mapped to the reference duration of 1 second.

The control unit 160 repeats steps 313 to 317 until the proximity is released. That is, the control unit 160 continues measuring the proximity duration. If the proximity duration is extended from 1 second to 2 seconds, the control unit 160 retrieves the indication number 1 mapped to the reference duration of 2 seconds from the memory 150 and then controls the audio processing unit 170 to output the sound 'one' corresponding to the indication number '1'.

In step 319, the control unit 160 monitors for release of the proximity of the object as shown in FIG. 6 and determines, when the proximity release is detected, the indication number mapped to the reference number corresponding to the measured proximity duration as one digit of the target call number in step 321. That is, the control unit 160 confirms the indication number retrieved from the memory as one digit of the target call number. For example, when the indication number of '0' is retrieved and then the proximity is released, the control unit 160 determines the indication number '0' as one digit of the target call number. The control unit 160 completes the target call number with a series of digits in step 323 and proceeds to step 219 of FIG. 2. At this time, the control unit 160 can control such that the display unit 131 displays the completed call number.

On the other hand, if it is determined in step 311 that proximity of an object is not detected in the sensor dialing mode, the control unit 160 measures a non-proximity duration for which no proximity of an object is detected in step 325. At this time, the control unit 160 can repeatedly determine whether proximity of any object is detected by the proximity sensor 140. If no proximity of any object is detected at the current time, the control unit 160 determines the proximity sensor periodically. While determining the proximity of any object, the control unit 160 determines whether the non-proximity duration is greater than a predetermined threshold value in step 327. If the non-proximity duration is not greater than the threshold value, the control unit 160 repeats steps 325 and 327. Otherwise, if the non-proximity duration is greater than the threshold value, the control unit 160 ends the sensor dialing mode. At this time, the control unit 160 deactivates the proximity sensor 140.

Returning to FIG. 2, after completing input of the target call number, the control unit 160 determines whether a call request is input in step 219. If no call request is detected, the control unit 160 repeats steps 215 and 217 until the call request is detected. That is, the control unit 160 updates the target call number in response to the user input in the sensor dialing mode. At this time, the control unit 160 can confirm the call number by editing each digit. For example, after the number '1' is determined as a digit of the call number at step 217, the control unit 160 can change the one digit number into a two digit number of '10'. That is, the control unit 160 can add another digit of '0' after the digit of '1' so as to be '10'.

After the confirmation of the target call number at step 217, the control unit 160 determines whether a call request is input by the user in step 219 and, if a call request is input, makes a call to the target call number in step 221. Here, the call request can be made by using a call key of the key input unit 120. The control unit 160 also can dial a plurality of digits constituting the target call number directly at the call request step. The target call number can be a device identity number of the counterparty, e.g., phone number. The target call number can be a shortcut number corresponding to a called party's phone number such that, when the call request is detected, the control unit 160 makes a call to the phone number mapped to the shortcut number. The control unit 160 also can control to end the sensor dialing mode. At this time, the control unit 160 deactivates the proximity sensor 140.

Although the description has been directed to a touch-screen-enabled communication terminal, the present invention is not limited thereto. That is, the terminal-driving method according to exemplary embodiments of the present invention can be applied to other types of terminals having no touchscreen. The communication terminal can be configured such that, once the target call number is determined, the display unit displays the target call number.

Although the description has been directed to a communication terminal equipped with a proximity sensor, the present invention is not limited thereto. That is, the present invention can be implemented with other types of sensors that can detect the approach of an object. For example, the communication terminal can be configured such that, when the sensor detects approach of an object, the communication terminal executes a predetermined function.

According to an exemplary embodiment of the present invention, the communication terminal detects the proximity of an object, i.e., a finger, and determines the value of a digit based on the proximity and/or proximity duration, thus there is no need to present the keys on the screen. This means that an exemplary communication terminal of the present invention allows the user to input the digits of a call number using another sense other than vision, resulting in freedom of sight and user convenience. With these advantageous features, the communication terminal supporting the driving method of the present invention allows even the visually impaired person to make a call without help of vision.

The above description has been directed to the case where the communication terminal detects the proximity of an object and makes a call to the phone number consisted of the digits determined based on the detected proximity. However, the communication terminal of the present invention is further capable of determining input data based on the duration of proximity of the finger such that it is possible to implement various functions based on the finger proximity detection.

As described above, the method and apparatus for driving a communication terminal according to exemplary embodiments of the present invention is capable of executing a function based on information on the proximity of a finger to the terminal, thereby negating the display of the keys on the touchscreen. Since the user input can be done by means of a sense other than the vision, the user can have freedom of sight. Also, the method and apparatus for driving a communication terminal according to exemplary embodiments of the present invention is advantageous to improve the user's convenience and allows even the visually impaired person to make use of a communication terminal conveniently.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for facilitating interactive feedback while driving a communication terminal, the method comprising:
    detecting a proximity of an object to a proximity sensor of the communication terminal by a proximity sensor included in the communication terminal;
    measuring a proximity duration of the object;
    determining a data mapped to the measured proximity duration;
    repeating the measuring of the proximity duration and the determining of the data in response to the proximity release before an execution request input is detected;
    notifying a retrieved indication number based on the data mapped to the proximity duration; and
    executing a function based on the determined data in response to the execution request input.

2. The method of claim 1, further comprising detecting a proximity release of the object from the proximity sensor.

3. The method of claim 1, wherein the data comprises a part of a phone number and the executing of the function comprises making a call to the phone number.

4. The method of claim 1, wherein the determining of the data comprises:
    retrieving an indication number based on the data mapped to the proximity duration to be the retrieved indication number; and
    determining the retrieved indication number as a digit of the phone number.

5. The method of claim 1, wherein the notifying of the retrieved indication number comprises outputting the indication number as a voice sound.

6. The method of claim 4, wherein the retrieving of the indication number comprises confirming the indication number as a digit of the phone number.

7. An apparatus for facilitating interactive feedback while driving a communication terminal, the apparatus comprising:
    a proximity sensor for sensing a proximity of an object to the communication terminal; and
    a control unit for measuring a proximity duration of the object through the proximity sensor, for determining a data mapped to the measured proximity duration, for repeating the measuring of the proximity duration and the determining of the data in response to the proximity release before an execution request input is detected, for notifying a retrieved indication number based on the data mapped to the proximity duration, and for executing, when the execution request input is detected, a function based on the determined data.

8. The apparatus of claim 7, wherein the control unit detects a proximity release of the object from the proximity sensor.

9. The apparatus of claim 7 further comprising a radio frequency unit for transmitting a call to a phone number as a series of the data under the control of the control unit, wherein the data is a part of the phone number.

10. The apparatus of claim 9, wherein the control unit retrieves an indication number based on the data mapped to the proximity duration to be the retrieved indication number, and determines the retrieved indication number as one of digits of the phone number.

11. The apparatus of claim 7 further comprising an audio processing unit for outputting the retrieved indication number as a voice sound under the control of the control unit.

12. The apparatus of claim 10, wherein the control unit confirms the indication number as a digit of the phone number.

13. The method of claim 1, wherein the object comprises a finger of a user, a stylus, or a physical object configured to provide a user input.

14. The apparatus of claim 7, wherein the object comprises a finger of a user, a stylus, or a physical object configured to provide a user input.

* * * * *